Figure 1:
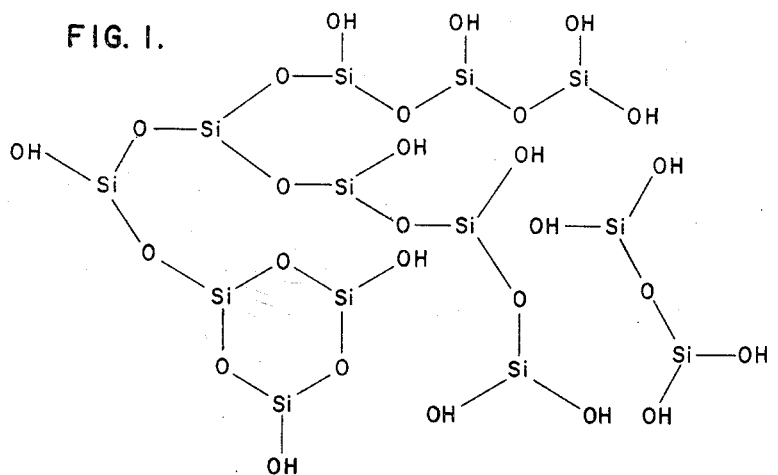

Dec. 25, 1962 J. K. KERVER ET AL 3,070,161
STABILIZING CONSOLIDATED SANDS
Filed Feb. 5, 1959

INVENTORS.
John K. Kerver,
Warren E. Holland,
BY
*James B. McCullough*
ATTORNEY

United States Patent Office 3,070,161
Patented Dec. 25, 1962

3,070,161
STABILIZING CONSOLIDATED SANDS
John K. Kerver and Warren E. Holland, Houston, Tex., assignors, by mesne assignments, to Jersey Production Research Company, Tulsa, Okla., a corporation of Delaware
Filed Feb. 5, 1959, Ser. No. 791,320
16 Claims. (Cl. 166—29)

The present invention is directed to a method for stabilizing a water-containing incompetent subsurface earth zone. More particularly, the invention is concerned with providing stability to an incompetent subsurface zone which has been consolidated by treatment with a liquid halide of silicon. In its more specific aspects, the invention is directed to producing hydrocarbons from stabilized consolidated subsurface earth zones which, prior to treatment, were incompetent.

The present invention may be briefly described as a method for stabilizing a water and hydrocarbon-containing incompetent subsurface earth zone which has been pierced by a well drilled therein. In the practice of the present invention, there is injected into the incompetent zone adjacent the well a liquid halide of silicon to consolidate the incompetent zone. Thereafter, the consolidated earth zone is treated with a reagent which causes said consolidated zone to be preferentially wet with hydrocarbons whereby said consolidated zone is stabilized against instability caused by water flow therethrough.

It has been observed that the subsurface earth zones, which are incompetent and which cause sand production, may be satisfactorily consolidated by treatment with a liquid silicon halide. However, while the strength and the permeability of the so-consolidated sands are entirely satisfactory, it has been observed that the length of the time the consolidated sand is stable is insufficiently long for continued economic production of hydrocarbons without accompanying production of sand which is deleterious. It has been found that this may be remedied in accordance with the practice of the present invention by treating the consolidated earth zone with a reagent which causes the consolidated earth zone to be preferentially wet with hydrocarbons such that water flowing through the consolidated zone does not destroy the strength and the permeability of the consolidated zone.

The liquid silicon halide is preferably a chloride of silicon such as silicon tetrachloride. However, other halides may be used such as the high molecular weight chlorides of silicon as exemplified by silicon hexachloride. Other high molecular weight chlorides such as octachloride of silicon may be used.

The liquid silicon halide is preferably introduced into the incompetent zone in oil or as in an oily solution thereof. For example, a solution of about 2% to about 80% of silicon tetrachloride in crude petroleum or fractions thereof, may be used. A solution containing from about 4% to about 40% is preferred. A solution of silicon tetrachloride in kerosene may be satisfactorily employed. While it is preferred to use an oil solution of silicon tetrachloride, it is possible in the practice of the present invention to use the pure silicon halide or tetrachloride.

In practicing the present invention, it may be desirable to inject oil into the formation to reduce the water saturation of the formation or incompetent zone to a low value. This may be done either before or after the consolidation treatment or both. The present invention is quite advantageous and useful in that while sands are consolidated by treatment with a liquid halogen compound of the type illustrated, after a period of time when water has contacted the consolidated zone, water flow through the consolidated zone causes the consolidated zone to lose strength and allow production of sand again. The production of sand is so serious at times that gas-oil separators may become filled with sand and flow lines and well tubing as well as wellhead equipment may become eroded by the production of sand with the oil and gas produced from the consolidated incompetent zone which has lost stability.

Figure 2:
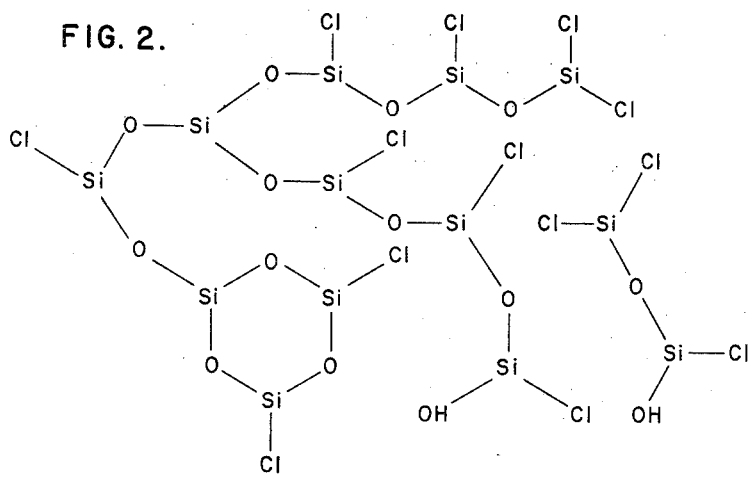

The invention may be illustrated by reference to the drawing in which FIGS. 1 and 2 illustrate structural configuration of the bonding precipitates resulting from treatment in accordance with the present invention.

In treatment of an incompetent earth zone with a liquid silicon halide such as silicon tetrachloride, it is believed that the silicon tetrachloride reacts with water in the pores of the sand to cause the formation of an amorphous siliceous compound. The precipitate which results has →Si—O—Si← linkages which are neither systematic nor continuous. In FIG. 1, such a structure is illustrated. This structure has a random nature in the configuration of the hydroxyl groups. As examination of FIG. 1 will show, it will be seen that many of the hydroxyl groups are in position for further reaction. Many of the hydroxyl groups are located so that reaction with other hydroxyl groups will be difficult or impossible in the conventional treatment. Therefore, in accordance with the present invention, the consolidated zone is treated with a reagent which causes the consolidated zone to be preferentially wet with hydrocarbons such as to prevent instability of the consolidated zone to flow of water.

Referring again to FIG. 1, the fourth bond of the silicon atom may be considered to be perpendicular to the plane of the sheet tying to and building up a similar random platelet to give a three dimensional structure. This structure contains many randomly spaced hydroxyl groups, and these hydroxyl groups cause the material to be susceptible to peptization or solution in flowing water and account for the instability of the consolidation treatment unless a stabilization step is included in accordance with the practice of the present invention. By practicing the present invention, water flow is prevented from contacting the hydroxyl groups and the consolidated zones remain in a stabilized condition.

The reaction as illustrated in FIG. 1 may represent the situation for the formation of the hydrated bonding precipitate. However, it is believed that concurrent with the initial reaction between the water and excess of silicon tetrachloride, there is incorporated in the hydrous mass a substantial number of silicon atoms with one, two, or three chlorine atoms still unreacted. Since all of the water is used up in the initial reaction and a large amount of silicon tetrachloride may remain unreacted, there may be competing reactions between the dehydration and interreaction of two hydroxyl groups and the reaction between the hydrogen of the hydroxyl group and additional silicon tetrachloride. The result may be a compound as illustrated in FIG. 2, which may represent an intermediate compound to FIG. 1. In other words, a silica-oxygen complex containing few, if any, hydroxyls and a large number of reactive chlorine atoms may result initially.

In order for the treating reagent of the present invention to be effective in the practice of the invention, especially when an organo-halosilane is employed, it is important that the chlorine atoms in the complex illustrated in FIG. 2 be converted to hydroxyls, but there should be little, if any, free water present. As a result, it is also important in the practice of the present invention that a sufficient time be allowed for treatment of the incompetent zone or formation with the oil solution of silicon halide. This time of contact should be sufficiently long to convert the silicon halide to the amorphous hydrated silica but not of sufficient duration to permit conversion of any substantial number of hydroxyls to chlorine containing radicals. The time of contact for treatment with the silicon halide may, therefore, be from about 5 minutes to about 120 minutes.

Likewise, to allow the organo-halosilane when it is employed as the treating reagent to penetrate the hydrous silica structure and react with the hydroxyls, it is important to provide a suitable time for contact with the organo-halosilane. This time may range from about 30 minutes up to about 48 hours.

The present invention will be further illustrated by the following examples in which a number of flow tubes were packed with Ottawa sand and saturated with oil in the presence of connate water to simulate an oil sand. These sands were then consolidated with either a 10% or a 20% solution of silicon tetrachloride in oil and the treatment was then followed with a 0.1% to about 15% by weight solution in oil of a reagent that promotes oil wetness. After treatment of the consolidated sand, it was tested for stability by flowing tap water at about 140° F. through the tube. The results of these operations are shown in Table I.

TABLE I

*Effect of Various Oil-Wetting Agents on the Stability to Tap Water (140° F.) of #16 Ottawa Sand After Consolidation With Silicon Tetrachloride*

| Core | Agent | Length of Time Core was Stable, days |
|---|---|---|
| 1 | Armeen 12—dodecylamine | 8 |
| 2 | ____do____ | 8 |
| 3 | ____do____ | 8 |
| 4 | ____do____ | 8 |
| 5 | Armeen 8—octylamine | 31 |
| 6 | Armeen 14D—tetradecylamine | 8 |
| 7 | Armac CD 50—mixed amine acetates primarily dodecyl. | 8 |
| 8 | Armac 14D—tetradecylamine acetate | 3 |
| 9 | none | approx. 1 |

All agents are Armour products.

From an examination of the data in Table I, it is clear that the treating reagents employed impart oil wetness and increase the stability from about 1 day to about 8 to 31 days.

After the consolidation and stabilization treatment, hydrocarbons may be produced from the consolidated and stabilized zone.

Another and preferred mode of practicing the present invention is to promote oil wetness of the consolidated zone with an agent which reacts chemically with the hydroxyl group to bond chemically with the consolidating precipitate and present to the stream of water a grouping that is water repellent. Such agents are the organo-halosilanes and particularly the aryl and alkyl-halosilanes such as the alkyl-chlorosilanes. The chlorine atom of the silanes is believed to react with the hydrogen of the hydroxyl group to give an →Si—O—Si← linkage with the water repellent organo group to protect the bonding precipitate.

To be most effective, this treatment may be employed when the free water content of the sands is low; thus treatment with an organo-halosilane is best with an oil solution of the organo-halosilane prior to contact of the formation by water after the consolidation treatment with the liquid halgen compound.

In accordance with the present invention, it is considered that the water in the zone to be consolidated may be reduced or lowered by a treatment with oil prior to the consolidation treatment, and after the consolidation treatment, any excess water remaining in the consolidated zone may also be removed by treatment by flowing oil and/or a solvent through the zone.

This may be achieved preferably by treating the formation with water after the consolidation treatment and then flowing an agent into the consolidated formation which is mutually oil and water soluble. Thus the water treatment may be followed by treatment with acetone, a lower aliphatic alcohol, and the like, which are mutually oil-water soluble and then displace water and solvent with the oil prior to treatment with the organo-halosilane.

In order to illustrate the latter feature of the present invention where organo-halosilanes were employed, several simulated incompetent zones were prepared by employing Ottawa sand in flow tubes as has been described in the previous examples. In these operations, the simulated sands were treated with the organo-chlorosilanes and then tested for stability to the flow of water at 140° F. The method of treatment and the identity of the organo-halosilanes is shown in Table II along with the results of the stability tests.

TABLE II

*Effect of Organo-Chlorosilane Treatments on Stability to Water of Sand Consolidated With Silicon Tetrachloride (Tap Water at 140° F.)*

| Cores | Post-Consolidation Preparation for Silane | Organo-chloro Silane Treatment | Length of Time Core was Stable, days |
|---|---|---|---|
| 10a and 10b | Kerosene flush (no free water) | Soaked, 4 days in hexadecyltrichlorosilane. | 73+ and 50. |
| 11a and 11b | Flowed water-in-oil emulsion | Injected 15% dodecyltrichlorosilane in kerosene. | 44 and 26. |
| 12a and 12b | Water-in-oil emulsion followed by oil containing emulsifier. | Same as above | 43 and 50. |
| 13 | Kerosene flush (no free water) | ____do____ | 106 (cracked). |
| 14a and 14b | Cleaned with hexane and water, and dried (surface film of water). | ____do____ | >125* and >125.* |
| 15a and 15b | Kerosene flush (no free water) | ____do____ | >70* and >70* (crude oil injected daily). |
| 16a, 16b, and 16c | Water flush after consolidation followed by acetone to remove all water but surface film, then oil flush to remove acetone. | Injected 2% dodecyltrichlorosilane in kerosene. | >46,* >46,* and >46* (core 16b, crude oil injected daily). |

*Core still stable at days shown.

Examining the data in Table II, it will be clear that the treatment in accordance with the present invention is effective in stabilizing the consolidated incompetent sands for periods of time longer than from 2 to 4 months. For example, at the present time some of the consolidated and stabilized sands show no signs of weakening.

In practicing the present invention, after the consolidation of the sand or incompetent zone with the liquid silicon halide, the surfactant or the organohalosilane is allowed to contact the consolidated zone for a period of time ranging from about 30 minutes to about 2 days or more. Thereafter, the hydrocarbons may be produced from the well which pierces the stabilized consolidated zone by lowering the pressure differential into the well bore from the consolidated incompetent zone and producing hydrocarbons such as oil and gas therefrom.

In order to illustrate the effect of time of contact on the stability of consolidated sands, a number of cores were prepared by treating Ottawa sand with a solution of silicon tetrachloride in kerosene for a particular period of time to consolidate same and thereafter the consolidated sand was treated with organo-halosilanes for various lengths of time prior to exposing them to flow of water at 140° F. These results are shown in Table III where the treatments, time of contact, and the stability of the resulting cores to water are presented.

(1) Alkylchlorosilanes:
    (a) Trichloromethylsilane
    (b) Dichlorodimethylsilane
    (c) Trichloroethylsilane
    (d) Trichloropropylsilane
    (e) Amyl silicon trichloride
    (f) Trichloro dodecylsilane
    (g) Trichloro hexadecylsilane
    (h) Chlorotrimethyl silane
(2) Other organo-halosilane:
    (a) Trichlorophenylsilane
    (b) Trichlorocyclohexylsilane
    (c) Trichlorovinylsilane
    (d) Dichlorodiphenylsilane

TABLE III

*Stability of Ottawa Sand to Tap Water at 140° F. After Consolidation With Silicon Tetrachloride*

| Core No. | SiCl₄ in Kerosene | | Silane | | | Stability, Days |
|---|---|---|---|---|---|---|
| | Percent SiCl₄ | Time of Contact | Kind | Percent | Time of Contact | |
| 17 | 10 | 5 min | $C_{12}$ | 10 | 125 min | Cracked after 106. |
| 18 | 20 | 6 min | $C_{12}$ | 15 | 126 min | Strong after 98. |
| 19 | 20 | 15 min | Injected kerosene, water, acetone, and kerosene, then— | | | Failed after 71. |
| | | | $C_{12}$ | 2 | 47 min | |
| 20 | 20 | 5 min | $C_{16}$ | 4 | 26 hr | Strong after 32. |
| 21 | 20 | 6 min | $C_{16}$ | 4 | 12 min | Failed after 20. |
| 22 | 20 | 20 hr | $C_{16}$ | 4 | 5 hr | Failed in less than 7. |

$C_{12}$=dodecyltrichlorosilane.
$C_{16}$=hexadecyltrichlorosilane.

The invention may be practiced by treating the consolidated zone at intervals with an agent which promotes oil wetness, for example, the consolidated zone may be treated with a treating reagent which promotes oil wetness and then hydrocarbons produced over a period of time from about 8 to 200 days and thereafter the treatment may be repeated with the agent which promotes oil wetness and production of hydrocarbons resumed.

In practicing the present invention where a surfactant is used, either an aqueous or oil solution of a surfactant may be employed. The amount of surfactant used in the solution may range from about 0.1% to about 15% by weight of the solution. The surfactant finding use in the present invention besides those illustrated in Table I, may include the following examples as illustrations.

(1) Salts of simple primary or tertiary amines such as:
    (a) Hexadecyl amine hydroacetate
    (b) Hexadecyl dimethyl amine hydroacetate
(2) Quaternary ammonium salts such as:
    (a) Hexadecyl dimethyl benzyl ammonium chloride
    (b) Cetyl dimethyl benzyl ammonium chloride
    (c) Octadecyl dimethyl ethyl ammonium chloride
(3) Salts and quaternary derivatives of amino acids such as:
    (a) Monostearoyl diethylene triamine dihydroacetate
    (b) Aminoethyl ethonolamine stearamide
(4) Salts and quaternary derivatives of imidazolines such as:
    (a) Hydroxyethyl
    (b) Heptadecenyl glyoxaldine
(5) Salts and quaternary derivatives of amino esters such as:
    (a) Alkyl diethyl ethanolamine
    (b) Oleyltriethanolamine The organo-halosilanes employed in the practice of the present invention will include the aryl and alkyl-halosilanes. Particularly, the alkyl-chlorosilanes may be used. Examples of other organo-halosilanes suitable for use in the practice of the present invention may include:

As will be seen from the several examples, the present invention is quite advantageous and useful. Not only are unstable or incompetent zones consolidated, but the consolidated incompetent zones are stabilized against flow of water destroying the strength thereof as has been experienced heretofore.

The nature and objects of the present invention having been completely described and illustrated what we wish to claim as new and useful and useful and secure by Letters Patent is:

1. A method for stabilizing a hydrocarbon and water-containing incompetent subsurface earth zone pierced by a well which comprises injecting into and contacting said incompetent zone adjacent said well with about 2% to about 80% solution in oil of a liquid halide of silicon in an amount in excess of that required to react with said water for a time within the range from about 5 to about 120 minutes to consolidate said incompetent zone and then treating said consolidated earth zone for a time within the range from about 30 minutes to about 48 hours with a 0.1% to about 15.0% by weight solution in oil of a reagent which causes said consolidated zone to be preferentially wet with said hydrocarbon whereby said consolidated zone is stabilized against flow of water therethrough.

2. A method in accordance with claim 1 in which the treating reagent is an organo-halosilane.

3. A method for stabilizing a hydrocarbon and water-containing incompetent subsurface earth zone pierced by a well which comprises injecting into and contacting said incompetent zone adjacent said well with about 2% to about 80% solution in oil of a liquid halide of silicon in an amount in excess of that required to react with said water for a time within the range from about 5 to about 120 minutes to consolidate said incompetent zone and then treating said consolidated earth zone for a time within the range from about 30 minutes to about 48 hours with a 0.1% to about 15.0% by weight solution in oil of a surfactant which causes said consolidated zone to be preferentially wet with said hydrocarbon whereby said consolidated zone is stabilized against flow of water therethrough.

4. A method in accordance with claim 3 in which the surfactant is dodecylamine.

5. A method in accordance with claim 3 in which the surfactant is octylamine.

6. A method in accordance with claim 3 in which the surfactant is an alkyl amine.

7. A method in accordance with claim 3 in which the surfactant is tetradecylamine.

8. A method in accordance with claim 3 in which the surfactant is dodecyl amine acetate.

9. A method for stabilizing a hydrocarbon and water containing incompetent subsurface earth zone pierced by a well which comprises injecting into and contacting said incompetent zone adjacent said well with about 2% to about 80% solution in oil of a liquid halide of silicon in an amount in excess of that required to react with said water for a time within the range from about 5 to about 120 minutes to consolidate said incompetent zone and then treating said consolidated earth zone for a time within the range from about 30 minutes to about 48 hours with a 0.1% to about 15% by weight solution in oil of an organo-chlorosilane which causes said consolidated zone to be preferentially wet with said hydrocarbon whereby said consolidated zone is stabilized against flow of water therethrough.

10. A method in accordance with claim 9 in which the organo-chlorosilane is hexadecyl-trichlorosilane.

11. A method in accordance with claim 9 in which the organo-chlorosilane is dodecyl trichlorosilane.

12. A method for stabilizing a hydrocarbon and water-containing incompetent subsurface earth zone pierced by a well which comprises flushing said incompetent zone with a liquid hydrocarbon to remove excess water, injecting into and contacting said incompetent zone adjacent said well with an oil solution of a 2% to 80% solution in oil of a liquid halide of silicon in an amount in excess of that required to react with said water for a time within the range from about 5 to about 120 minutes to consolidate said incompetent zone, and then treating said consolidated earth zone for a time within the range from about 30 minutes to about 48 hours with a 0.1% to about 15.0% by weight solution of an organo-chlorosilane in oil which causes said consolidated zone to be preferentially wet with said hydrocarbon whereby said consolidated zone is stabilized against flow of water therethrough.

13. A method for stabilizing a hydrocarbon and water-containing incompetent subsurface earth zone pierced by a well which comprises injecting into and contacting said incompetent zone adjacent said well with about 4% to about 40% solution in oil of a liquid halide of silicon in an amount in excess of that required to react with said water for a time within the range from about 5 to about 120 minutes to consolidate said incompetent zone and then treating said consolidated earth zone for a time within the range from about 30 minutes to about 48 hours with a 0.1% to about 15.0% by weight solution in oil of an organo-halosilane which causes said consolidated zone to be preferentially wet with said hydrocarbon whereby said consolidated zone is stabilized against flow of water therethrough.

14. A method in accordance with claim 13 in which the organo-halosilane is an alkyl chlorosilane.

15. A method in accordance with claim 13 in which the organo-halosilane is an aryl chlorosilane.

16. A method for producing hydrocarbon from a hydrocarbon and water-containing incompetent subsurface earth zone pierced by a well which comprises injecting into and contacting said incompetent zone adjacent said well with about 2% to about 80% solution in oil of a liquid halide of silicon in an amount in excess of that required to react with said water for a time within the range from about 5 to about 120 minutes to consolidate said incompetent zone, then treating said consolidated earth zone for a time within the range from about 30 minutes to about 48 hours with a 0.1% to about 15.0% by weight solution in oil of a reagent which causes said consolidated zone to be preferentially wet with said hydrocarbon whereby said consolidated zone is stabilized against flow of water therethrough, producing hydrocarbon from said stabilized consolidated zone for a time within the range from about 8 to about 200 days, interrupting said production of hydrocarbon, again treating said stabilized consolidated earth zone with a 0.1% to about 15.0% by weight solution in oil of said reagent for a time within the range from about 30 minutes to about 48 hours, and then resuming production of hydrocarbon from said stabilized consolidated zone.

References Cited in the file of this patent

UNITED STATES PATENTS

| | | |
|---|---|---|
| 2,019,908 | Kennedy et al. | Nov. 5, 1935 |
| 2,259,875 | Bent et al. | Oct. 21, 1941 |
| 2,469,354 | Bond | May 10, 1949 |
| 2,614,635 | Williams et al. | Oct. 21, 1952 |
| 2,808,886 | Bail et al. | Oct. 8, 1957 |